United States Patent
Pampus et al.

(10) Patent No.: US 11,307,306 B2
(45) Date of Patent: Apr. 19, 2022

(54) METHOD AND DEVICE FOR PROVIDING ULTRASONIC SIGNAL INFORMATION

(71) Applicant: Robert Bosch GmbH, Stuttgart (DE)

(72) Inventors: Christian Pampus, Leonberg (DE); Michael Schumann, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 201 days.

(21) Appl. No.: 16/488,061

(22) PCT Filed: Feb. 21, 2018

(86) PCT No.: PCT/EP2018/054232
§ 371 (c)(1),
(2) Date: Aug. 22, 2019

(87) PCT Pub. No.: WO2018/153892
PCT Pub. Date: Aug. 30, 2018

(65) Prior Publication Data
US 2020/0025916 A1    Jan. 23, 2020

(30) Foreign Application Priority Data
Feb. 23, 2017   (DE) .......................... 102017202964.1

(51) Int. Cl.
*G01S 7/539* (2006.01)
*G01S 15/10* (2006.01)

(52) U.S. Cl.
CPC ............ *G01S 15/108* (2013.01); *G01S 7/539* (2013.01)

(58) Field of Classification Search
CPC .............................. G01S 15/108; G01S 7/539
See application file for complete search history.

(56) References Cited

FOREIGN PATENT DOCUMENTS

| | | | |
|---|---|---|---|
| DE | 102010033210 A1 | 2/2012 | |
| DE | 102010033213 A1 * | 2/2012 | ............... G01S 7/53 |
| DE | 102010033213 A1 | 2/2012 | |
| DE | 102013015402 A1 | 4/2015 | |
| DE | 112015004824 T5 | 7/2017 | |
| GB | 2327266 A | 1/1999 | |
| JP | 2015152325 A * | 8/2015 | |
| RU | 2444009 C1 * | 2/2012 | |
| WO | 2016063529 A1 | 4/2016 | |

OTHER PUBLICATIONS

International Search Report dated May 29, 2018 of the corresponding International Application PCT/EP2018/054232 filed Feb. 21, 2018.

* cited by examiner

*Primary Examiner* — Isam A Alsomiri
*Assistant Examiner* — Abdallah Abulaban
(74) *Attorney, Agent, or Firm* — Norton Rose Fulbright US LLP; Gerard Messina

(57) ABSTRACT

A method for providing ultrasonic signal information includes receiving a plurality of echo signals, ascertaining a relatedness of individual echo signals from the plurality of echo signals based on a run time and/or a significance of the echo signals, grouping the echo signals for which a relatedness was ascertained in an echo signal group, and providing a property that is characteristic for the echo signal group. The present invention furthermore relates to a device associated with the method.

7 Claims, 4 Drawing Sheets

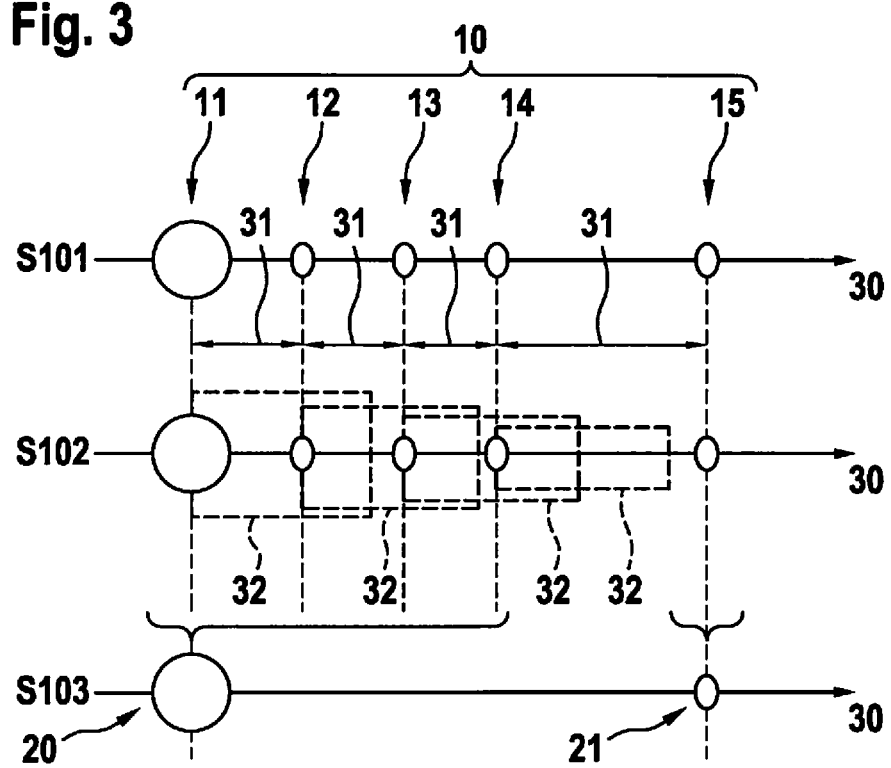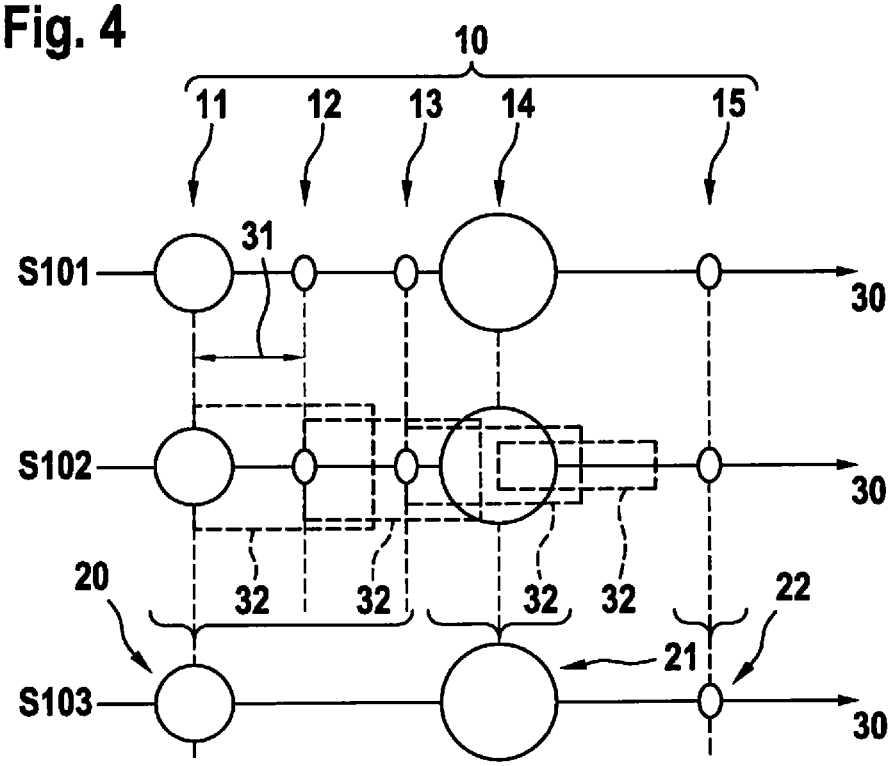

METHOD AND DEVICE FOR PROVIDING ULTRASONIC SIGNAL INFORMATION

CROSS-REFERENCE TO RELATED APPLICATIONS

The present application is the national stage of International Pat. App. No. PCT/EP2018/054232 filed Feb. 21, 2018, and claims priority under 35 U.S.C. § 119 to DE 10 2017 202 964.1, filed in the Federal Republic of Germany on Feb. 23, 2017, the content of each of which are incorporated herein by reference in their entireties.

FIELD OF THE INVENTION

The present invention relates to a method and a device for providing ultrasonic signal information.

BACKGROUND

In so-called ultrasonic trilateration systems, multiple ultrasonic sensors are involved in a measurement in order to ascertain the position of an object through measured run time differences of object echoes, which are detected by the ultrasonic sensors involved in the measurement.

If only one echo from an object is measured and only one object is present in the detecting range of the ultrasonic sensors, then the assignment of which echoes are to be combined with one another is definite. If the ultrasonic sensors receive more than one echo, ambiguities arise. A definite echo assignment for generating an intersection, which is required for trilateration, is no longer given. In this case, one obtains object positions for all theoretically possible echo pairings, that is, also for ones that are not real and that are referred to as false positives.

Multiple echoes appear precisely when either multiple objects are located in the detecting range of the ultrasonic sensors or when multiple echoes from one object are measured. As a result of the increased sensitivity of ultrasonic sensors, especially the second case mentioned gains in importance.

Hitherto errors were minimized in that only a first echo received was used in a pairing required for trilateration.

SUMMARY

According to an example embodiment of the present invention, a method for providing ultrasonic signal information includes receiving a plurality of echo signals, ascertaining a relatedness of individual echo signal from the plurality of echo signals based on a run time and/or a significance of the echo signals, grouping the echo signals, for which a relatedness was ascertained, in an echo signal group, and providing a property characteristic for the echo signal group.

According to an example embodiment of the present invention, a device for providing ultrasonic signal information comprises an ultrasonic receiver, which is designed to receive a plurality of echo signals, and an electronics designed to ascertain a relatedness of individual echo signals from the plurality of echo signals based on a run time and/or a significance of the individual echo signals, to group the echo signals, for which a relatedness was ascertained, into an echo signal group and to provide a property that is characteristic for the echo signal group.

Such a device and such a method reduce an occurrence of false positives in a trilateration by multi-echo processing. A further processing of received echo signals is moreover simplified. It is no longer necessary to process the received echo signals individually, but rather it is possible to process the echo signal groups, in particular their characteristic properties. The expenditure for a subsequent signal processing is considerably reduced.

An echo signal is in this context a signal segment limited in time, which is associated with a previously emitted ultrasonic signal. In particular, the echo signal is a signal that was received by an ultrasonic receiver and was emitted by an ultrasonic transmitter. The ultrasonic transmitter and the ultrasonic receiver are either separate components, which are in particular situated in different positions, or are combined in a single component, for example an ultrasonic sensor. Thus, the ultrasonic signal is transmitted for example by a first ultrasonic sensor and the associated echo signal is received by a second ultrasonic sensor.

The run time is a time, which elapses between an emission of the ultrasonic signal and a reception of the echo signal. The significance is a value that describes a similarity between an echo signal and the associated ultrasonic signal. The significance is in particular a value that is ascertained using an optimal filter or matching filter. The significance describes in particular a signal similarity of the echo signal to the ultrasonic signal or a signal similarity of the echo signal to an expected echo signal.

The characteristic property provided for the echo signal group is a property that describes the echo signals associated with the echo signal group. The characteristic property can be any property that is ascertained based on the properties of the echo signals associated with the signal group. This can also be a property of an individual representative echo signal from the echo signal group.

Preferably, when ascertaining the relatedness of individual echo signals, a first criterion for the relatedness of two consecutive echo signals is that a runtime difference between the run times of the two consecutive echo signals is smaller than a specific time value. In other words, this means that two individual echo signals are evaluated as related if they are received within a specified time interval. This makes it possible to ascertain the relatedness of individual echo signals in a simple manner. This first criterion makes it in particular possible to determine reliably whether multiple echo signals were reflected on a common object. The relatedness is an indicator as to whether individual echo signals were reflected on a common object.

The specific time value is preferably a variable value, which is selected in particular as a function of a significance of the first echo signal received of the two consecutive echo signals. Thus, the time value is preferably selected to be large if the significance of the echo signal that is received first is large. Accordingly, it is advantageous if the specific time value is reduced if the significance of the initially received echo signal is low. Thus, the time value is set to a first value for example if the significance is above a specified threshold value and is set to a second value if the significance is below a specified threshold value, the first value being greater than the second value. The specific time value is a time interval. Such a dependency between run time and significance as a criterion for ascertaining the relatedness makes it possible in particular to ascertain an affiliation with a specific object, which has continuous reflective properties that also extend across a specific space, however.

It is also advantageous if the specific time value is reduced after a relatedness of the two consecutive echo signals was ascertained. In this manner, an extent of an echo signal group over time is limited. The extent of the echo signal group over time is a time between a reception of a first echo signal of the echo signal group and a final signal of the echo signal group.

It is furthermore advantageous if in ascertaining the relatedness of individual echo signals a second criterion for the relatedness of two consecutive echo signals is that a significance of the initially received echo signal is greater than or equal to a significance of the subsequently received echo signal. It can be assumed that a significance diminishes over the run time of an echo signal. Thus, if an echo signal is received that has a high run time, then this has a lower significance than an echo signal with a lower run time. If a rise of a significance is detected in the time characteristic of the reception of a plurality of echo signals, then it can be assumed that at least two objects are responsible for a reflection of the echo signals. This allows for a particularly precise distinction of objects from the information of a plurality of echo signals.

It is also advantageous if in ascertaining the relatedness of individual echo signals, a criterion against the relatedness of two consecutive echo signals is that the echo signal received later can be assigned to another echo signal group. This makes it possible to perform a historical evaluation of the received plurality of echo signals. From the run time of an individual echo signal in past transmitting and receiving cycles, it is possible for example to ascertain an expected run time of the individual echo signal in a current transmitting and receiving cycle. A run time change of the individual echo signal will correspond to a run time change of all echo signals from the associated echo signal group. An ascertainment is thus made from a first transmitting cycle as to which echo signal group a plurality of echo signals received in a second transmitting cycle belong. Thus, in the second transmitting cycle, it is only necessary to assign the remaining plurality of echo signals to a group that does not already belong to the echo signal group recognized in the first transmitting cycle. It is thus possible to achieve a particularly precise assignment of the echo signals to echo signal groups.

It is furthermore advantageous if a classification of an object, on which the echo signals were reflected, is performed based on the property characteristic for the echo signal group. The characteristic property is in particular a group property composed of properties of the echo signals belonging to the echo signal group. Advantageous characteristic properties are in this instance a succession in time of the individual echo signals of the echo signal group and a characteristic curve of a significance of the echo signals across the plurality of echo signals of the echo signal group. Thus, it is possible in particular to infer a property of the object. It is possible to detect, for example, whether there is a planar obstacle, such as for example a vehicle, or whether there is a structured obstacle, such as for example a bush.

It is also advantageous if the property characteristic for the echo signal group is a significance of the initially received echo signal of the echo signal group, the significance of the initially received echo signal being adapted in particular as a function of a number of the echo signals grouped in the echo signal group. The significance is thus for example increased by a specified value with an increasing number of echo signals. The fact that the characteristic property is a significance makes it possible to use it readily as a probability density in further processing. In the process, the characteristic property is rendered more precise, which allows for a particularly accurate evaluation. It is also advantageous if the method further includes an emission of a plurality of ultrasonic signals, and if the significance of an echo signal is ascertained from a comparison of an emitted ultrasonic signal with the echo signal. This occurs in particular using an optimal filter. In this manner it is possible to determine the significance of the individual echo signals with particular accuracy.

Example embodiments of the present invention are described in detail below with reference to the accompanying drawings.

BRIEF DESCRIPTION OF THE DRAWINGS

FIG. 3 is a representation of an echo grouping during a reception of an exemplary first plurality of echo signals, according to an example embodiment of the present invention.

FIG. 4 is a representation of the echo grouping during a reception of an exemplary second plurality of echo signals, according to an example embodiment of the present invention.

DETAILED DESCRIPTION

Figure 1:
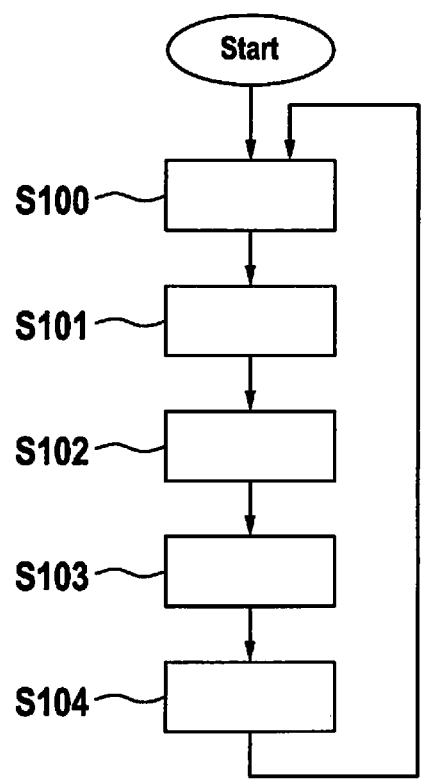
FIG. 1 is a flowchart that illustrates a method according to an example embodiment of the present invention.
Figure 2:
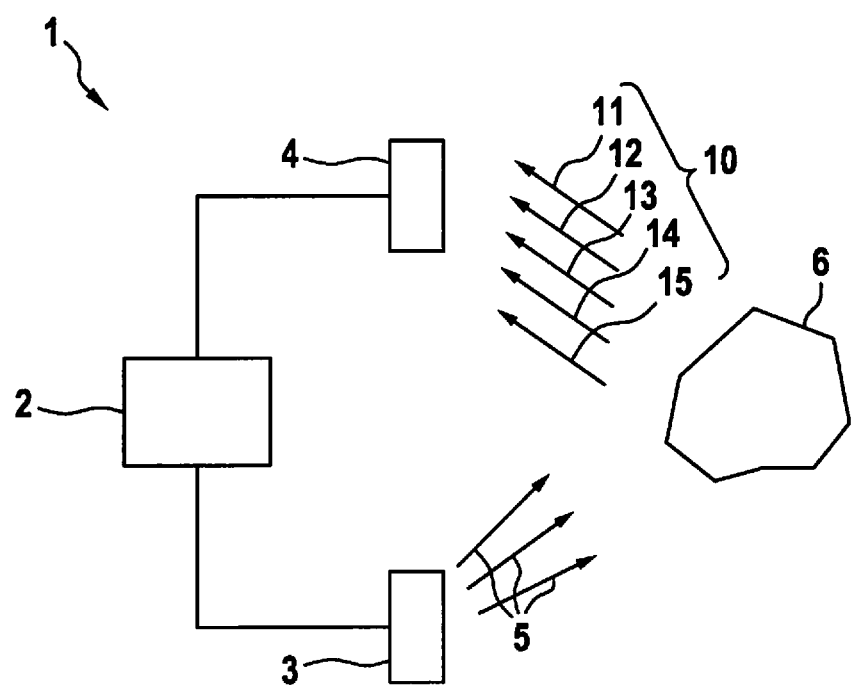
FIG. 2 illustrates a device for providing ultrasonic signal information according to an example embodiment of the present invention.

FIG. 1 is a flowchart of a method for providing ultrasonic signal information according to an example embodiment of the present invention. The method is implemented by a device 1 as depicted in FIG. 2 for providing ultrasonic signal information.

Device 1 includes an electronics 2 designed to carry out the method for providing ultrasonic signal information. In addition, device 1 includes a first ultrasonic sensor 3 and a second ultrasonic sensor 4. First and second ultrasonic sensors 3, 4 include an ultrasonic receiver and an ultrasonic transmitter. The ultrasonic transmitter is created in that a diaphragm of the respective ultrasonic sensor 3, 4 is excited to oscillate in a transmitting phase. The ultrasonic receiver is created in that the diaphragm of the respective ultrasonic sensor 3, 4 picks up oscillations from an environment of the ultrasonic sensor in a receiving phase and converts these into an electrical signal. The electrical signal is transmitted to electronics 2. The second ultrasonic sensor 4 is identically constructed as ultrasonic sensor 3.

In the following, initially only first ultrasonic sensor 3 will be considered. An operating principle of second ultrasonic sensor 4 corresponds to that of first ultrasonic sensor 3.

When the method for providing ultrasonic signal information is started, a first method step S100 is performed. In first method step S100, an ultrasonic signal 5 is emitted. Ultrasonic signal 5 is emitted in the transmitting phase by first ultrasonic sensor 3. The ultrasonic signal can have different signal shapes. The ultrasonic signal has in particular a constant frequency or has a chirp shape. It is also possible that data are modulated upon the ultrasonic signal. Ultrasonic signal 5 propagates in different directions as soon as it is emitted by first ultrasonic sensor 3.

If ultrasonic signal 5, which propagates as sound waves in the surroundings of first ultrasonic sensor 3, strikes an object 6, then it is reflected by object 6 and in the process is also reflected in the direction of first ultrasonic sensor 3. Since ultrasonic signal 5 has propagated in different directions, however, not only a single signal is reflected to first ultrasonic sensor 3, but rather a plurality of echo signals 10 are reflected in the direction of first ultrasonic sensor 3, each one of echo signals 10 having been reflected at a different point of object 10. Since the individual echo signals 11, 12, 13, 14, 15 from the plurality of echo signals 10 have a different point of origin on object 6, these individual echo signals 11, 12, 13, 14, 15 will not arrive at first ultrasonic sensor 3 at the same time. They will also differ in their signal shape and their signal amplitude.

Following the emission of ultrasonic signal 5 in first step S100, a second step S101 is performed. In second step S101, the plurality of echo signals 10 are received. This occurs by second ultrasonic sensor 4 when the latter is in a receiving phase. The second ultrasonic sensor 4 is thus the ultrasonic receiver. Echo signals 10 excite the diaphragm of second ultrasonic sensor 4, which converts echo signals 10 into electrical signals. The further processing of echo signals 10 occurs through a processing of the associated electrical signals by electronics 2. Since the signal properties of echo signals 10 and of the associated electrical signals are identical however, for the sake of simplicity, reference continues to be made to echo signals 10.

Since both first ultrasonic sensor 3 as well as second ultrasonic sensor 4 include an ultrasonic receiver and an ultrasonic transmitter, the emission of ultrasonic signal 5 and the reception of the plurality of echo signals 10 are performed respectively by both ultrasonic sensors 3, 4. In the process, ultrasonic sensors 3, 4 can receive echo signals from ultrasonic signals that they themselves emitted and/or echo signals from ultrasonic signals that were emitted by the respectively other ultrasonic sensor 3, 4.

After second step S101, a third step S102 is performed. This step is performed by a signal processing in electronics 2. In third step S102, a relatedness of individual echo signals 11, 12, 13, 14, 15 from the plurality of echo signals 10 is ascertained. This occurs based on a run time 30 and a significance of echo signals 10.

First, run time 30 of each individual echo signal 11, 12, 13, 14, 15 is ascertained. The run time is ascertained by calculating a difference between a time of emission of ultrasonic signal 5 and a reception of the respective echo signal 11, 12, 13, 14, 15. This time difference is the run time 30 associated with the respective echo signal 11, 12, 13, 14, 15.

Furthermore, the significance of the individual echo signals 11, 12, 13, 14, 15 is ascertained. For this purpose, each one of echo signals 11, 12, 13, 14, 15 runs through an optimal filter, also called a matched filter, which is geared to the signal shape of ultrasonic signal 5. An amplitude at the output of optimum filter is regarded as the significance of the respective echo signal 11, 12, 13, 14, 15, which has just run through the optimal filter. Thus, at least an amplitude of the respective echo signal 11, 12, 13, 14, 15 as well as its similarity in its signal shape vis-a-vis the emitted ultrasonic signal 5 enter into the significance.

Subsequently, run time 30 and the significance of each of the individual echo signals 11, 12, 13, 14, 15 of the plurality of echo signals 10 are considered in order to infer a relatedness of individual echo signals from the plurality of echo signals 10. This occurs based on specified rules. In this example embodiment, the relatedness of individual echo signals is ascertained based on a first and a second criterion.

In alternative example embodiments, the relatedness is ascertained merely on one of the two criteria. This occurs in accordance with the described example embodiment, but where an examination of the respectively other criterion is omitted.

The first criterion in ascertaining the relatedness of individual echo signals points to a relatedness of two consecutive echo signals if a run time difference 31 between run times 30 of the two consecutive echo signals is smaller than a specific time value 32. The run time difference 31 is a difference between the respective run time 30 of the two consecutive echo signals. A check is performed to determine whether run time difference 31 is smaller than the specific time value 32 by checking whether run time difference 31 is below a specified threshold value that describes the specific time value 32.

When ascertaining the relatedness of individual echo signals, the second criterion for the relatedness of two consecutive echo signals is whether a significance of the initially received echo signal is greater than or equal to a significance of the subsequently received echo signal.

If the first and the second criteria indicate a relatedness of two consecutive echo signals, these are marked as related. In an example embodiment both criteria must be fulfilled. In alternative example embodiments, it suffices if one of the criteria is fulfilled in order to ascertain a relatedness.

The grouping occurs in a fourth step S103 of the method, which is performed after third step S102. For this purpose, at least one echo signal group 20, 21 is set up, and echo signals 11, 12, 13, 14, 15, which were marked as related, are added to this echo signal group. If different instances of relatedness are ascertained for different echo signals 11, 12, 13, 14, 15, then several echo signal groups are set up.

Following the fourth step S103 of the method, a fifth step S104 is performed. In fifth step S104, a property characteristic for the respective echo signal group 20, 21 is provided.

In an example embodiment, the characteristic property is the significance and the run time of the respectively first echo signal in time of echo signals 11, 12, 13, 14, 15, which belong to an echo signal group 20, 21. In alternative example embodiments, the significance of the echo signal that is received first is adapted as a function of a number of the echo signals 11, 12, 13, 14, 15 grouped in echo signal group 20, 21. This occurs for example in that a significance value of the further echo signals of the echo signal group is added to the significance of the first echo signal of echo signal group 20, 21.

FIGS. 3 and 4 show exemplary sequences of echo signals 10. The steps of ascertaining the relatedness of individual echo signals and of grouping the individual echo signals 10 will now be described in more detail based on FIGS. 3 and 4.

FIGS. 3 and 4 respectively show in an uppermost row a time line, which represents the run time 30 of echo signals 10. The run time results from a beginning of the time line and a point at which the respective echo signal 11, 12, 13, 14, 15 of the plurality of echo signals 10 is represented. The beginning of the time line is thus the point in time at which the ultrasonic signal 5 was emitted. A reception of one of echo signals 10 is represented by a circle on the time line. The position of the circle thus represents the respective run time 30 of the associated echo signal 11-15. A size of circle represents the significance of the respective echo signal 11, 12, 13, 14, 15.

Reference is made to FIG. 3. The time line in the uppermost row of FIG. 3 shows that five echo signals 11, 12, 13, 14, 15 were received. Thus, a first echo signal 11, a second echo signal 12, a third echo signal 13, a fourth echo signal 14, and a fifth echo signal 15 were received. The first through fifth echo signals 11, 12, 13, 14, 15 form the plurality of echo signals 10.

In a time sequence, initially the first echo signal 11, then the second echo signal 12, then the third echo signal 13, then the fourth echo signal 14, and finally the fifth echo signal 15 were received. The significance of second echo signal 12, of third echo signal 13, of fourth echo signal 14, and of fifth echo signal 15 is identical. The significance of first echo signal 11 is greater than the significance of the second through fifth echo signal 12, 13, 14, 15. A run time difference 31, that is, a period of time that has elapsed between the reception of an echo signal and the preceding echo signal, is constant for the second through fourth echo signal 12, 13, 14. The period of time, which has elapsed between the reception of fourth echo signal 14 and fifth echo signal 15, is greater than this period of time.

The uppermost row in FIG. 3 thus describes the signal properties of the plurality of echo signals 10, which were received in second step S101. In the second row from the top, FIG. 3 shows the ascertainment of the relatedness of the individual echo signals 11, 12, 13, 14, 15 according to the first and the second criterion.

First, a check is performed according to the first criterion as to whether a run time difference 31 between the run times 30 of two consecutive echo signals 10 is smaller than a specific time value 31. Initially, the first echo signal 11 and the second echo signal 12 are considered. A check is performed to determine whether the run time difference 31, which results from the run times 30 of these two echo signals, is smaller than the specific time value 32. The specific time value 32 is represented in FIG. 3 as a rectangle, which extends in accordance with an extension corresponding to time value 32 along the time line. The run time difference 31 between first echo signal 11 and second echo signal 12 is smaller than the specific time value 32. This can be seen in that the second echo signal is located within the rectangle associated with first echo signal 11. The first criterion is thus fulfilled.

Subsequently, the second criterion is checked. That is to say, a check is performed to determine whether the significance of the initially received echo signal, that is, of first echo signal 11, is greater than or equal to the significance of the echo signal received later, that is, of second echo signal 12. First echo signal 31 is represented as a larger circle than second echo signal 12. Thus, the significance of first echo signal is greater than the significance of second echo signal 12 that is received later. The second criterion is thus also fulfilled.

Hence, the first echo signal is ascertained as belonging together with the second echo signal 12. First echo signal 11 and second echo signal 12 are grouped in a first echo signal group 20.

Subsequently, second echo signal 12 and third echo signal 13 are considered. Since the run time difference between the run times of second echo signal 12 and third echo signal 13 is likewise lower than the specific time value 32, the first criterion is again fulfilled. The significances of the second echo signal and of the third echo signal are identical. The second criterion is thus also fulfilled. Third echo signal 13 is thus added to first echo signal group 20. In the same manner, third echo signal 13 and fourth echo signal 24 are considered, which yields the same result. Thus, the fourth echo signal 14 is also added to first echo group 20.

The first criterion is applied to fourth echo signal 14 and fifth echo signal 15. The result is that the run time difference 31 between the run times 30 of fourth echo signals 14 and of fifth echo signal 15 is greater than the specific time value 32. The fifth echo signal 15 is therefore not added to first echo signal group 20 since the first criterion is not fulfilled. Instead, a new echo signal group is applied to second echo signal group 21 and the fifth echo signal is added to the second echo signal group 21.

Echo signal groups 20, 21 are represented in a third row in FIG. 3. In this example embodiment, the significance and the run time of the respectively first echo signal of an echo signal group 20 are provided as a characteristic property. The first echo signal group 20 is thus represented by the run time and the significance of first echo signal 11. The second echo signal group 21 is represented by the run time and the significance of the fifth echo signal.

FIG. 4 shows another example for a sequence of received echo signals 11-15. The first through fifth echo signal 11-15 are received in an identical time sequence and at identical intervals, as is also shown in FIG. 3. The significance of fourth echo signal 14, however, is greater than the significances of the remaining echo signals, that is, of the echo signals of the first through third echo signal 11-13 and of fifth echo signal 15.

This has the result that when checking whether the second criterion is fulfilled when third echo signal 13 and fourth echo signal 14 are considered, the second criterion is regarded as not met. This is due to the fact that the significance of fourth echo signal 14 is greater than the significance of third echo signal 13. Fourth echo signal 14 is therefore not assigned to first echo signal group 20. Instead, second echo signal group 21 is already created at this time and the fourth echo signal is added to second echo signal group 21. If fourth echo signal 14 and fifth echo signal 15 are considered, then a relatedness fails because it does not meet the first criterion. Thus, another echo signal group, in this case a third echo signal group 22, is set up.

An echo signal group 20, 21, 22, which comprises only one single echo signal, does not necessarily have to be regarded as an echo signal group, but can continue to be processed as an individual echo signal. Thus, the second echo signal group 21, which results from the situation shown in FIG. 3, or the third echo signal group, which results from the situation shown in FIG. 4, can also be regarded as an individual echo signal. In the example shown in FIG. 3, this means that first through fourth echo signals 11-14 are represented by first echo signal group 20, and that fifth echo signal 15 is not grouped, but is rather processed further as an individual signal.

In this example embodiment, the process of providing the property characteristic for echo signal group 20, 21, 22 also involves a classification of object 6, on which echo signals 10 were reflected. It is assumed that in this evaluation, that is, in the grouping of the echo signals in accordance with the present invention, echo signals 10 are combined into an echo signal group 20, 21, 22 that were reflected on a common object. Thus, it can be seen from FIG. 3 and FIG. 4, for example, that an echo signal group 20, 21, 22 can exhibit a specific significance curve in its individual echo signals. From this significance curve, object 6 can be inferred, on which the individual echo signals belonging to echo signal group 20, 21, 22 were reflected. Thus, it is inferred for example that an echo signal group 20, 21, 22 is the result of the existence of a bush, if a plurality of echo signals of low significance succeed one another. If an echo signal group 20, 21, 22 has only few individual signals, but which have a high significance, then there is for example a planar surface such as a wall for example.

A second example embodiment of the present invention corresponds essentially to the above-described first example embodiment of the invention. In the second example embodiment of the present invention, the specific time value is always reduced after a relatedness of two consecutive echo signals was ascertained. This reduction of the specific time value 32 occurs respectively for consecutive echo signals 11, 12, 13, 14, 15 within an echo signal group 20, 21, 22. In other words, this means that the first criterion is tightened step-by-step, that is, it is all the more difficult to fulfill, the more echo signals already belong to an echo signal group 20, 21, 22.

Alternatively or additionally, the specific time value 32 is a variable value, which is selected as a function of a significance of the first echo signal received of two consecutive echo signals. For this purpose, the specific time value 32 is determined for example in that a significance of an echo signal 11, 12, 13, 14, 15 is ascertained, and an associated specific time value 32 is ascertained for example by using a plurality of threshold values. This means in other words that the first criterion for a subsequent echo signal is all the more easy to fulfill the greater is the significance of the previously received echo signal.

In further alternative example embodiments, a third criterion is introduced in addition to the first and second criterion or as an alternative to the first or second criterion. This means that a relatedness of two consecutive echo signals is no longer given if the echo signal 11, 12, 13, 14, 15 received later can be assigned to another echo signal group 20, 21, 22.

Figure 5:
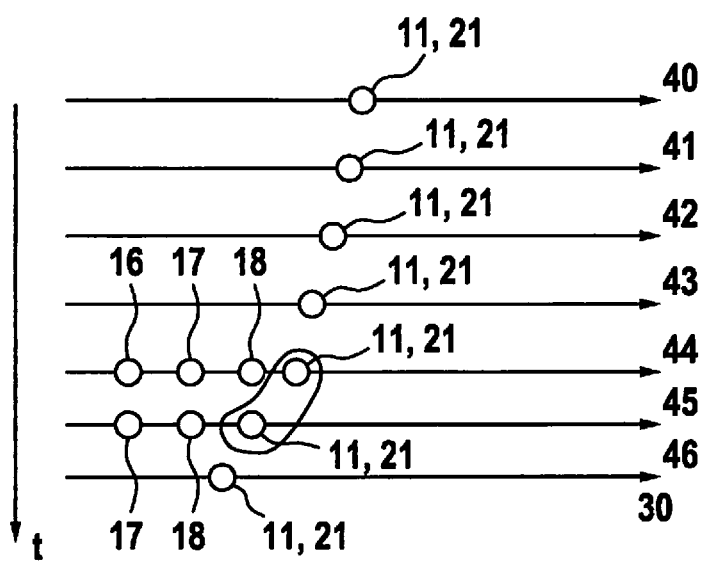
FIG. 5 is a graphic representation of a historical evaluation of received echo signals according to an example embodiment of the present invention.

This is shown by way of example in FIG. 5. The different rows in FIG. 5 represent different transmitting and receiving phases of the first and of the second ultrasonic sensors 3, 4. The first and the second ultrasonic sensors 3, 4, thus perform multiple measurements. In each of the measurements represented in the different rows, first ultrasonic signal 11 is visible. The object, which causes the first echo signal 11, approaches the first and the second ultrasonic sensors 3, 4. Hence, the run time 30 of the first echo signal 10 is constantly reduced and, with each measurement, the first echo signal 11 approaches the origin of the respectively associated time line, which is on the left in FIG. 6. First ultrasonic sensor 3 thus performs at least seven measurements, which are represented in FIG. 6 by first through seventh time lines 40-46.

In a fifth and sixth measurement by first and second ultrasonic sensors 3, 4, an additional object enters the environment of first and second ultrasonic sensors 3, 4. Hence, additional echo signals, that is, sixth through eighth echo signals 16, 17, 18, are received. Sixth through eighth echo signals 16, 17, 18 have a lower run time 31 than first echo signal 11. Since it can be assumed that object 6, which reflected first echo signal 11, is moving constantly in the environment of first ultrasonic sensor 3, and it can thus also be assumed that run time 31 of first echo signal 11 changes continuously or remains constant, it is also possible to infer that the suddenly occurring echo signals, that is, sixth through eighth echo signals 16, 17, 18, do not belong to first echo signal 11. In the example represented in FIG. 6, particularly in the fifth measurement 44, the first echo signal is thus not grouped with the sixth through eighth echo signal 16, 17, 18. The first echo signal 11 shown in FIG. 6 can likewise be an echo signal group, which is represented by the value of first echo signal 11.

A method is thus created for reducing false positives in the trilateration by multi-echo processing. This involves an identification and a combination of multiple echo signals 11, 12, 13, 14, 15 into one object 6 in order to reduce the number of available echo signals 11, 13, 14, 15 for the trilateration. For this purpose, essentially two features are used: on the one hand, the run times of echo signals 11, 12, 13, 14, 15, since echo signals from one and the same object 6 occur with similar run times; and on the other hand, the significance of echo signals 11, 12, 13, 14, 15, i.e., how important echo signals 11, 12, 13, 14, 15 are in comparison to one another.

In this manner, fewer false positives are obtained by trilateration of echo signals 12, 12, 13, 14, 15 that do not fit with one another. Furthermore, a computing load is reduced for subsequent processing steps. In addition, a lower communication volume is achieved in the event that echo signals 12, 12, 13, 14, 15 are to be provided to a user at a data interface.

The echo signals 12, 12, 13, 14, 15 of a sensor are combined into echo signal groups 20, 21, 22, the echo signals 12, 12, 13, 14, 15 of an echo signal group 20, 21, 22 being preferably assigned to one single object 6 if possible. Echo signal groups 20, 21, 22 are reduced in a subsequent step to the first echo signal, and the number of the grouped echo signals as well as their echo properties (e.g. significance, run time differences) are assigned to the first echo signal as additional features.

The combination of echo signals 12, 12, 13, 14, 15 occurs by spanning a period of time, triggered by the run time of a first echo signal in time. The period of time describes the run time difference 32 of consecutive echo signals 11, 12, 13, 14, 15.

If one or multiple echo signal groups 20, 21, 22 are within the period of time, then echo signals 11, 12, 13, 14, 15 are assigned to echo signal group 20, 21, 22, but only if the conditions for the significances are fulfilled.

Every grouped echo signal 11, 12, 13, 14, 15 triggers a further time period, which extends the search window for echo signal group 20, 21, 22 accordingly. The time periods are preferably chosen to be equal. Alternatively, it is possible to shorten the time periods with an increasing number of periods or a variation of the time periods as a function of the significances of echo signals 11, 12, 13, 14, 15 (echo signals of greater significance span a greater window than an echo of lesser significance). Because of the observation that the run time differences of echo signals 11, 12, 13, 14, 15 of an object 6 cannot become arbitrarily large, the search window is limited to a maximum "group time," it being possible for the maximum group time to be dependent on distance. Typical values for the maximum group time are in the range of 3 to 6 ms.

An advantageous example embodiment is obtained if the combination of echo signals 11, 12, 13, 14, 15 is designed as a function of the significance of echo signals 11, 12, 13, 14, 15. This is based on the observation that in many cases the first reflection of an object 6 is the one having the highest significance. The echo significance can be a measure of the signal strength. In the most simple case, the significance is proportional to the echo amplitude of echo signals 11, 12, 13, 14, 15, it being possible additionally to couple the echo significance to the phase information in the case of coded signals.

Thus, it is possible to make use of the following criteria in the grouping of echo signals 11, 12, 13, 14, 15:

If a significance of a subsequent echo signal is smaller than or equal to a significance of the first echo signal, then a grouping is allowed.

If a significance of a subsequent echo signal is greater than a significance of the first echo signal, then the grouping is to be stopped.

If a significance of a subsequent echo signal is equal to a significance of the first echo signal, and if at the same time the significance is above a specified threshold value, that is, if it is very high, then the grouping is to be stopped.

Another advantageous example embodiment is obtained if the significance of the first echo signal of an echo signal group 20, 21, 22 is changed following the grouping as a function of the number of grouped echo signals 11, 12, 13, 14, 15. A further advantageous example embodiment is obtained if the grouping is combined by a combination with a historical consideration of the echo sequence, concretely in that echo signals 11, 12, 13, 14, 15 is not grouped if they match a sequence of echo signals 11, 12, 13, 14, 15, that is, if they stem with high probability from a second object.

Another advantageous example embodiment is obtained if the composition of echo signals 11, 12, 13, 14, 15 and their significance is used to classify an object based on this signature. For example, a vehicle in reflection is frequently made up of a prominent first reflection and subsequent reflections that are much less significant. A bush, by contrast, provides scattering and largely similarly significant reflections.

Together with the above disclosure, explicit reference is made to the disclosure of FIGS. 1-6.

What is claimed is:

1. A method for providing ultrasonic signal information, the method comprising:
   emitting, via an ultrasonic transmitter of a first ultrasonic sensor, an ultrasonic signal having a constant frequency or a chirp shape;
   receiving, via an ultrasonic receiver of a second electronic sensor, a plurality of echo signals reflected by different points of an object, wherein each of the ultrasonic sensors include the ultrasonic receiver and the ultrasonic transmitter, wherein since each of the echo signals from the plurality of echo signals have a different point of origin on the object, the echo signals arrive at the ultrasonic sensors at different times and have different signal shapes and signal amplitudes, and wherein the emitting of the ultrasonic signal and the receiving of the plurality of echo signals are performed respectively by both of the ultrasonic sensors, so that the ultrasonic sensors can receive the echo signals from the ultrasonic signals that they themselves emitted and/or echo signals from the ultrasonic signals emitted by the other of the ultrasonic sensors;
   ascertaining one or more relationships that are each of respective subsets of the plurality of echo signals, each of the relationships being of the echo signals of the respective subset to each other and being at least based on run times and a respective significance of each of the echo signals; and
   grouping, for each of the subsets or which a respective one of the one or more relationships has been ascertained, the echo signals of the respective subset into a respective echo signal group, and providing a property that is characteristic of the respective echo signal group;
   wherein a run time of each of the echo signals is determined by calculating a time difference between a time of emission of the ultrasonic signal and a reception of a respective one of the echo signals, and wherein the time difference is the run time associated with the respective one of the echo signals,
   wherein the significance of each of the echo signals is determined by running each one of the echo signals through an optimal or matched filter, which is configured to a signal shape of the ultrasonic signal, wherein an amplitude at an output of the filter is regarded as the significance of each of the echo signals, so that at least an amplitude of a respective one of the echo signals and its similarity in its signal shape with respect to the emitted ultrasonic signal is used to determine the significance of echo signal,
   wherein a first criterion in ascertaining the relatedness of individual echo signals points to a relatedness of two consecutive echo signals if the run time difference between run times of the two consecutive echo signals is smaller than a specific time value, wherein the run time difference is a difference between a respective run time of the two consecutive echo signals, wherein a check is performed to determine whether run time difference is smaller than the specific time value by checking whether the run time difference is below a specified threshold value that describes the specific time value,
   wherein in ascertaining the relatedness of individual echo signals, the second criterion for the relatedness of two consecutive echo signals is whether a significance of the initially received echo signal is greater than or equal to a significance of the subsequently received echo signal, and wherein if the first and the second criteria indicate a relatedness of two consecutive echo signals, they are marked as related, and
   wherein the specific time value is a variable value, which is selected as a function of a significance of the first echo signal received of two consecutive echo signals.

2. The method of claim 1, wherein the specific time value is reduced after a relatedness of the two consecutive echo signals is ascertained.

3. The method of claim 1, wherein the ascertaining of the one or more relationships includes determining, as a criterion of relatedness between two consecutive ones of the plurality of echo signals, that the significance of a first received one of the two consecutive echo signals is at least as great as a significance of the other of the two consecutive echo signals.

4. The method of claim 1, wherein the ascertaining of the one or more relationships includes determining, as a criterion against relatedness between two consecutive ones of the plurality of echo signals, that a second received one of the two consecutive echo signals is assignable to an echo signal group different than the other of the two consecutive echo signals.

5. The method of claim 1, further comprising:
   classifying, for a respective one of the echo signal groups, an object from which the echo signals of the echo signal group were reflected based on a property characteristic for the echo signal group.

6. The method of claim 1, wherein the significance of the first received on the echo signals of the respective echo signal group is adapted as a function of a number of the echo signals grouped in the respective echo signal group.

7. A device for providing ultrasonic signal information, comprising:
   an ultrasonic transmitter of a first ultrasonic sensor to transmit an ultrasonic signal having a constant frequency or a chirp shape;
   an ultrasonic receiver of a second electronic sensor to receive a plurality of echo signals, reflected by different points of an object, wherein each of the ultrasonic sensors include the ultrasonic receiver and the ultrasonic transmitter, wherein since each of the echo signals from the plurality of echo signals have a different point of origin on the object, the echo signals arrive at the ultrasonic sensors at different times and have different signal shapes and signal amplitudes, and wherein the emitting of the ultrasonic signal and the receiving of the plurality of echo signals are performed respectively by both of the ultrasonic sensors, so that the ultrasonic sensors can receive the echo signals from the ultrasonic signals that they themselves emitted and/or echo signals from the ultrasonic signals emitted by the other of the ultrasonic sensors; and an electronics arrangement for performing the following:
  ascertaining one or more relationships that are each of respective subsets of the plurality of echo signals, each of the relationships being of the echo signals of the respective subset to each other and being at least based on run times and a respective significance of each of the echo signals; and
  grouping, for each of the subsets or which a respective one of the one or more relationships has been ascertained, the echo signals of the respective subset into a respective echo signal group, and providing a property that is characteristic of the respective echo signal group;
wherein a run time of each of the echo signals is determined by calculating a time difference between a time of emission of the ultrasonic signal and a reception of a respective one of the echo signals, and wherein the time difference is the run time associated with the respective one of the echo signals,
wherein the significance of each of the echo signals is determined by running each one of the echo signals through an optimal or matched filter, which is configured to a signal shape of the ultrasonic signal, wherein an amplitude at an output of the filter is regarded as the significance of each of the echo signals, so that at least an amplitude of a respective one of the echo signals and its similarity in its signal shape with respect to the emitted ultrasonic signal is used to determine the significance of echo signal,
wherein a first criterion in ascertaining the relatedness of individual echo signals points to a relatedness of two consecutive echo signals if the run time difference between run times of the two consecutive echo signals is smaller than a specific time value, wherein the run time difference is a difference between a respective run time of the two consecutive echo signals, wherein a check is performed to determine whether run time difference is smaller than the specific time value by checking whether the run time difference is below a specified threshold value that describes the specific time value,
wherein in ascertaining the relatedness of individual echo signals, the second criterion for the relatedness of two consecutive echo signals is whether a significance of the initially received echo signal is greater than or equal to a significance of the subsequently received echo signal, and wherein if the first and the second criteria indicate a relatedness of two consecutive echo signals, they are marked as related, and
wherein the specific time value is a variable value, which is selected as a function of a significance of the first echo signal received of two consecutive echo signals.

* * * * *